(12) United States Patent
Dobson et al.

(10) Patent No.: US 6,706,210 B1
(45) Date of Patent: Mar. 16, 2004

(54) TERNARY OXIDE PHOSPHOR PARTICLES

(75) Inventors: Peter James Dobson, Oxford (GB); Garreth Wakefield, Oxford (GB)

(73) Assignee: Isis Innovation Limited, Oxford (GB)

( * ) Notice: Subject to any disclaimer, the term of this patent is extended or adjusted under 35 U.S.C. 154(b) by 0 days.

(21) Appl. No.: 09/857,934
(22) PCT Filed: Dec. 17, 1999
(86) PCT No.: PCT/GB99/04300
§ 371 (c)(1), (2), (4) Date: Oct. 15, 2001
(87) PCT Pub. No.: WO00/36051
PCT Pub. Date: Jun. 22, 2000

(30) Foreign Application Priority Data

Dec. 17, 1998 (GB) .............................. 9827859
May 20, 1999 (GB) .............................. 9911781

(51) Int. Cl.⁷ .............................................. C09K 11/08
(52) U.S. Cl. ........................ 252/301.4 R; 252/301.6 R
(58) Field of Search ................... 428/690; 252/301.4 R, 252/301.6 R, 301.36

(56) References Cited

U.S. PATENT DOCUMENTS

| | | | |
|---|---|---|---|
| 4,032,471 | A | 6/1977 | Luckey |
| 5,413,736 | A | 5/1995 | Nishisu et al. |

(List continued on next page.)

FOREIGN PATENT DOCUMENTS

| | | |
|---|---|---|
| DE | 42 10 153 A1 | 3/1992 |
| EP | 0 253 552 A2 | 1/1988 |

(List continued on next page.)

OTHER PUBLICATIONS

Shea et al, "Synthesis of Red–Emitting, Small Particle Size Luminescent Oxides Using an Optimized Combustion Process", J. Amer. Ceramic Soc., 79(12), pp 3257–3265, 1996.*

(List continued on next page.)

*Primary Examiner*—C. Melissa Koslow
(74) *Attorney, Agent, or Firm*—Wolf, Greenfield & Sacks, P.C.

(57) ABSTRACT

Phosphor compositions are prepared by treating metal oxides or mixed-metal oxides with refractory metals to form cathodoluminescent phosphors stimulatable by electrons of very low energy. The phosphors comprise 90% to 100% of a mixed metal oxide $M_xT_yO_z$ (where M is a metal selected from Zn, Sn, In, Cu, and combinations thereof; T is a refractory metal selected from Ti, Zr, Hf, V, Nb, Ta, Cr, Mo, W, and combinations thereof; and O is Oxygen, x, y, and z being chosen such that z is at most stoichiometric for $M_xT_yO_z$) and 0% to 10% of a dopant comprising a substance selected from a rare earth element of the lanthanide series, Mn, Cr, and combinations thereof, or stoichiometrically excess Zn, Cu, Sn, or In. A blue-light-emitting phosphor based on ZnO treated with $Ta_2O_5$ or Ta to form $Ta_2Zn_3O_8$ is characterized by CIE 1931 chromaticity values x and y, where x is between about 0.14 and 0.20 and y is between about 0.05 and 0.15. In preferred embodiments, a process is specially adapted for forming the phosphor in an electrically-conductive thin-film or surface-layer form in situ during fabrication of displays. A preferred in situ process has an integrated etch stop, which precisely defines the depth of an opening in a field-emission display structure utilizing the low-energy-electron excited phosphor. A field-emission display comprises cells, each having a field-emission cathode and an anode comprising at least one cathodoluminescent phosphor. Arrangements of various color phosphors may be made by selective deposition of suitable dopants. The display cell structures may also have gate elements for controlling electron current flowing to the anode and its phosphor when suitable voltages are applied.

12 Claims, 4 Drawing Sheets

U.S. PATENT DOCUMENTS

| | | | |
|---|---|---|---|
| 5,637,258 A | | 6/1997 | Goldburt et al. |
| 5,893,999 A | * | 4/1999 | Tamatani et al. ...... 252/301.4 R |
| 6,039,894 A | * | 3/2000 | Sanjurjo et al. ...... 252/301.4 R |
| 6,100,633 A | * | 8/2000 | Okumura et al. ........... 313/486 |
| 6,180,029 B1 | * | 1/2001 | Hampden-Smith et al. .......... 252/301.4 R |

FOREIGN PATENT DOCUMENTS

| | | |
|---|---|---|
| EP | 0 256 535 A1 | 2/1988 |
| EP | 0 257 138 A1 | 3/1988 |
| EP | 257138 * | 3/1988 |
| EP | 0 684 072 A2 | 11/1995 |
| EP | 0 732 356 A2 | 9/1996 |
| FR | 2 677 139 A1 | 5/1992 |
| GB | 1 458 700 | 12/1976 |
| GB | 2 032 450 A | 5/1980 |
| JP | 46031844 A4 | 9/1971 |
| NL | 8 202 824 A | 2/1983 |
| WO | WO 96/01297 A1 | 1/1996 |
| WO | WO 97/35943 A1 | 10/1997 |
| WO | WO 98/10459 A1 | 3/1998 |
| WO | WO 99/46204 A1 | 9/1999 |
| WO | WO 00/36050 A | 6/2000 |

OTHER PUBLICATIONS

Phillips et al "Effects of Processing on The Low–Voltage Performance of Cathodoluminescent Garnt Phosphors", $27^{th}$ Int. SAMPE Tech. Conf., pp. 501–506, Oct. 9–12, 1995.*

Bihari et al., "Spectra and dynamics of monoclinic $Eu_2O_3$ and $EU^{3+}:Y_2O_3$ nanocrystals," *J. Luminescenc.*, 75: 1–10 (1997).

Goldburt et al., "Size dependent efficiency in Tb doped $Y_2O_3$ nanocrystalline phosphor," *J. Luminescence*, 72–74: 190–192, (1997).

Cho et al., Improved luminescence properties of pulsed laser deposited $Eu:Y_2O_3$ thin films on diamond coated silicon substrates *Phys. Lett*, 71(23): 3335 (1997).

Sommerdijk et al., "Influence of Host Lattice on the Infrared–Excited Visible Luminescence in $Yb^{3+},Er^{3+}$–Doped Oxides," *J. Luminescence* 5(4), Abstract Only (1972).

Shea et al., "Synthesis of Red–Emitting, Small Particle Size Luminescent Oxides Using an Optimized Combustion Process," *J. Amer. Ceramic Soc.*, 79(12): 3257–3265 (1996).

Phillips and Shea, "Effects of Processing on the Low–Voltage Performance of Cathodoluminescent Garnet Phosphors," *27th Int. SAMPE Tech. Conf.*, 501–505 (1995).

Blasse, G., "Classical phosphors: A Pandora's Box," *J. of Luminescence* 72–74: 129–134 (1997).

Sordelet and Akinc, "Preparation of Spherical, Monosized $Y_2O_3$ Precursor Particles," *J. of Colloid and Interface Sci.* 122(1): 47–59 (1988).

Hase et al., "Phosphor Materials for Catode–Ray Tubes," *Advances in Elec. and Electron Phys.*, vol. 79, 327 (1990, Academic Press, Inc.).

Kobayashi, "Preparation of ultrafine precursor particles for $Y_2O_3$ from $YCI_3$/ethylenediaminestetracetic acid/urea aqueous solution," *J. of Materials Sci. Ltrs.*, 11(11): 767–.

Sordelet et al., "Synthesis of Yttrium Aluminum Garnet Precursor Powders by Homogeneous Precipitation," *J. Eur. Ceramic Soc.* 14: 123–130 (1994).

Giesche and Matijevic, "Preparation, characterization, and sinterability of well–defined silica/yttria powders," *J. Mater. Res.* 9(2): 436–450 (1994).

* cited by examiner

TERNARY OXIDE PHOSPHOR PARTICLES

RELATED APPLICATIONS

This application is a national stage filing under 35 U.S.C. §371 of PCT International application PCT/GB99/04300, filed Dec. 17, 1999, which was published under PCT Article 21(2) in English. Foreign priority benefits are claimed under 35 U.S.C. §119(a)–(d) or 35 U.S.C. §365(b) of Great Britain application number GB 9911781.4, filed May 20, 1999 and Great Britain application number GB 9827859.1, filed Dec. 17, 1998.

The present invention relates to rare earth activated phosphors. Such phosphors are known to possess excellent light output and colour rendering properties and have been utilized successfully in many display technologies. One particularly successful material, europium activated yttrium oxide ($Y_2O_3:Eu^{3+}$), has shown particular promise in the field of field emission display.

The successful introduction of field emitting displays is dependent upon the availability of low voltage phosphors. As the phosphor exciting electrons have a comparatively low energy (less than 2 kV) as compared to conventional phosphors and one must avoid the use of sulphur to reduce contamination, new types of material have to be used. In particular, it is desirable to be able to make phosphor particles without a surface dead layer which occurs when fine particles are prepared using a conventional grinding technique. This dead layer is an important source of non-radiative luminescence routes for low energy electrons.

It is known that colloidal chemical techniques may be used to provide sub 100 nm particles of compounds such as $Y_2O_3$ and that these may be doped to form nanocrystalline red emitting $Y_2O_3:Eu^{3+}$. However, binary oxide materials such as $Y_2O_3$ and $Gd_2O_3$ are not efficient hosts for elements other than europium. In particular, they cannot be used as host materials for blue emitting cerium based phosphors.

Accordingly, there is the need to obtain small, typically nanocrystalline, particles which will provide different emission colours.

It has now been found, according to the present invention, that as well as red emitting particles, other coloured emitting particles can be obtained when using as a host a ternary oxide, that is to say an oxide which is derived from another element apart from yttrium, gallium etc. Accordingly the present invention provides particles of a compound of formula:

$$Z_zX_xO_y:RE$$

where Z is a metal of valency b

X is a metal or metalloid, of valency a, such that $$2y=b.z+a.x, \text{ and}$$

RE is a dopant ion of terbium, europium, cerium, thulium, samarium, holmium, erbium, dysprosium, praseodymium, manganese, chromium or titanium, having a size not exceeding 1 micron.

It will be appreciated that X must be such as will be capable of forming an anion with oxygen.

Generally the particles are nanoparticles, by which is meant particles having a size not exceeding 100 nm, generally not exceeding 50 nm and especially not exceeding 30 nm.

Z is typically trivalent or pentavalent and is preferably yttrium, gadolinium, gallium or tantalum with yttrium being particularly preferred. X is generally divalent or trivalent, preferably aluminium, silicon or zinc, with aluminium particularly preferred.

The rare earth element is preferably europium, terbium, cerium, thulium or dysprosium.

Particular particles of the present invention are those derived from yttrium and aluminium, yttrium and silicon, tantalum and zinc or zinc and gallium.

Specific compounds of the present invention include $Y_3Al_5O_{12}:Tb^{3+}$(referred to as YAG:Tb), $Y_2SiO_5:Ce^{3+}$, $Ta_2Zn_3O_8$ and $ZnGa_2O_4$.

Thus the particles of the present invention can be green emitting as with $Y_3Al_5O_{12}:Tb^{3+}$ or blue as in $:Ce^{3+}$ although green emission may also be obtained from the yttrium aluminium compound if the concentration of terbium is reduced. Other colours can be obtained from other specified rare earth elements, for example, as follows: orange-samarium, blue-holmium, near infra-red-erbium or white-disprosium.

In general, the particles of the present invention are in the form of single crystals.

The particles of the present invention can generally be prepared by the coprecipitation of salts of the two metals (for simplicity X will be referred to hereafter as a metal) of, the ternary oxide and of the "rare earth" element in aqueous solution at elevated temperature which is then calcined to the oxide. According to the present invention there is provided a process for preparing the particles of the present invention which comprises:

preparing an aqueous solution of salts of Z, X and RE and a water-soluble compound which decomposes under the reaction conditions to convert said salts into hydroxycarbonate, heating the solution so as to cause said compound to decompose, recovering the resulting precipitate and calcining it at a temperature of at least 500° C.

This process is similar to that disclosed in GB Application No. 9827860.9 The water-soluble compound which decomposes under the reaction condition is typically urea, which is preferred, or a weak carboxylic acid such as oxalic acid or tartaric acid. The urea and other water soluble compounds slowly introduce $OH^-$ ligands into the solution until the solubility limit has been reached. When the urea decomposes it releases carbonate and hydroxide ions which control the precipitation. If this is done uniformly then particles form simultaneously at all points and growth occurs within a narrow size distribution.

The nature of the salts of the metals is not particularly critical provided that they are water soluble. Typically, the salts are chlorides, but, for instance, aluminium perchlorate can also be used.

The reaction is carried out at elevated temperature so as to decompose the water soluble compound. For urea, the lower temperature limit is about 70° C.; the upper limit of reaction is generally 100° C.

The relative amounts of the two metal salts should be such as to provide the appropriate ratio of the metals in the mixed oxide. This can, of course, be found by simple experiment. Careful control of the relative amounts can be important as there is a tendency for the compounds to form a number of phases.

Doping with the "rare earth" metal salt can be carried out by adding the required amount of the dopant ion, typically from 1 to 10%, for example about 5% (molar).

The reaction mixture can readily be obtained by mixing appropriate amounts of aqueous solutions of the salts and adding the decomposable compound.

It has been found that rather than start the process by dissolving salts of the desired elements there are advantages to be obtained by preparing the salts in situ by converting the corresponding oxides to these salts. Apart from the fact that oxides are generally significantly cheaper than the corresponding chlorides or nitrates, it has also been found that the cathodoluminescence of the resulting particles can be superior.

It has been found that better results can generally be obtained by keeping the reaction vessel sealed. This has the effect of narrowing the size distribution of the resulting precipitate.

An important feature of the process is that decomposition takes place slowly so that the compounds are not obtained substantially instantaneously as in the usual precipitation techniques. Typically for urea, the reaction is carried out at, say, 90° C. for one to four hours, for example about 2 hours. After this time precipitation of a mixed amorphous/nanocrystalline phase is generally complete. This amorphous stage should then be washed and dried before being calcined. Decomposition of urea starts at about 80° C. It is the temperature which largely controls the rate of decomposition.

Calcination typically takes place in a conventional furnace in air but steam or an inert or a reducing atmosphere such as nitrogen or a mixture of hydrogen and nitrogen can also be employed. It is also possible to use, for example, a rapid thermal annealer or a microwave oven. The effect of using such an atmosphere is to reduce any tendency the rare earth element may have from changing from a 3+ ion to a 4+ ion. This is particularly prone in the case of terbium and cerium as well as $Eu^{2+}$. The use of hydrogen may also enhance the conductivity of the resulting crystals. Calcination generally requires a temperature of at least 500° C., for example 600° C. to 900° C., such as about 650° C. It has been found that by increasing the calcination temperature the crystallite size increases. Indeed it is possible to produce monocrystals having a larger particle size by this process. It has also been found that by increasing the crystallite size of the resulting particles the luminescence of the particles is enhanced.

In general it has been found that grain growth becomes significant once the temperature reaches 1000° C. While there is a small improvement in crystallite size when using 900° C. rather than 600° C. this is relatively insignificant compared with the increases which occur once the temperature is raised to 1000° C. or above. In general the temperature required is from at least one third to half the bulk melting point of the oxide (the Tamman temperature) which is typically of the order of 2500° C. Best results are generally obtained towards the upper end of this range.

Time also plays a part and, in general, at higher temperatures a shorter time can be used. In general the calcination is carried out at a temperature and time a sufficient to produce a crystallite size of at least 35 nm, generally at least 50 nm.

The time of calcination is generally from 30 minutes to 10 hours and typically from 1 hour to 5 hours for example about 3 hours. A. typical calcination treatment involves a temperature of at least 1050° C., eg. 1050° C. for 3 hours while at lower temperatures a time from 3 to 6 hours is typical. In general, temperatures above 1300 to 1400° C. are not needed. In order to augment crystallite size it is possible to incorporate flux agents which act as grain boundary promoters such as titania, bismuth oxides, silica, lithium fluoride and lithium oxide.

While, in the past, using a lower temperatures of calcination, crystallite sizes of the order of 20 nm are obtained it has been found, according to the present invention, that crystallite sizes of at least 50 nm are regularly obtainable. Indeed crystallite sizes as much as 200 nm can be obtained without difficulty. As the temperature of calcination increases the particles have a tendency to break up into single or monocrystalline particles. If the calcination takes place for too long there is a danger that the particles will not disperse. Obviously the particle size desired will vary depending on the particular application of the phosphors. In particular the acceleration voltage affects the size needed such that at 300 volts a crystallite size of the order of 50 nm is generally suitable.

The urea or other decomposable compound should be present in an amount sufficient to convert the salts into hydroxycarbonate. This means that the mole ratio of eg. urea to salt should generally be at least 1:1. Increasing the amount of urea tends to increase the rate at which hydroxycarbonate is formed. If it is formed too quickly the size of the resultant particles tends to increase. Better results are usually obtained if the rate of formation of the particles is relatively slow. Indeed in this way substantially monocrystalline particles can be obtained. In general the mole ratio of urea or other decomposable compound to salt is from 1:1 to 10:1, for example from 1:1 to 8:1, say 2:1 to 6:1 or 2:1 to 5:1, for example about 3:1 although higher ratios may be desirable if the initial solution is acidic and sometimes they improve yield. Typically the pH will be from about 0.5 to 2.0 although somewhat different values may be used if the salt is formed in situ. In general, the effect of the mole ratio on crystallite size is insignificant when the calcination temperature exceeds 1000° C.

A variant of this process is needed where the initial salt can precipitate. Thus in the case of silicon, it is desirable first to form a seed particle of silicon which is then reacted to form a "metal/dope and shell" around it. Thus silicon tetrachloride, for example, is precipitated from water to form a hydrated silicon oxide. This colloidal solution is then added to a solution of the other metal salts and of the dopant salt. The other steps of the process including the addition of the decomposable compound can then be carried out as discussed above. Other particles which can be prepared in a similar manner include $Ta_2Zn_3O_8$ (tantalum oxide particles with a precipitation of zinc around it) doped with terbium and manganese for green and red emission and $ZnGa_2O_4$ gallium oxide particles with a zinc precipitate doped with manganese, terbium, europium or cerium.

The particles of the present invention are suitable for use in FED type displays. For this purpose the particles can be embedded in a suitable plastics material by a variety of methods including dip coating, spin coating and meniscus coating or by using an air gun spray. Accordingly, the present invention also provides a plastics material which incorporates particles of the present invention.

Suitable polymers which can be employed include polyacrylic acid, polystyrene and polymethyl methacrylate. Such plastics materials can be used for photoluminescence applications and also in electroluminescence applications where an AC current is to be employed. If a DC current is employed then conducting polymers such as polyvinylcarbazole, polyphenylenevinylidene and polymethylphenylsilane can be employed. Poly 2-(4-biphenylyl) 5-(4-tertiarybutyl phenyl)-1,3,4-oxidiazole (butyl-PBD) can also be used. Desirably, thepolymer should be compatible with the solvent, typically methanol, used to apply the particles to the plastics material.

Typically, the particles will be applied to a thin layer of the plastics material, typically having a thickness from 0.5 to 15 microns.

The maximum concentration of particles is generally about 35% by weight with 65% by weight of polymer. There is a tendency for the polymer to crack if the concentration exceeds this value. A typical minimum concentration is about 2% by weight (98% by weight polymer). If the concentration is reduced below this value then "holes" tend to form in the plastics material.

The following Examples further illustrate the present invention.

EXAMPLE 1

Synthesis of YAG:Tb

This procedure involves co-precipitation of yttrium, aluminium and terbium in an aqueous solution at elevated temperatures to form 20–30 nm amorphous particles, which are then calcined into the oxide.

(1) 0.15 M solutions of $YCl_3$ and $Al(ClO_4)_3$ are mixed in the ratio of 15:25 by volume.

To this a 5M urea solution is added to double the volume of the constituents.

Doping is carried out by adding the required (typically 5%) amount of the dopant ion in the form of a 0.15M solution of terbium chloride.

(2) The reaction vessel is sealed and raised to 90° C. in a water bath for 2 hours. After this time precipitation of the amorphous phase will be complete.

(3) The amorphous phase is washed several times and dried.

(4) The amorphous phase is then fired in air at a temperature greater than 600° C. for three hours. This results in the crystallisation of the amorphous phase into 10–20 nm nanocrystals of YAG:Tb.

Figure 1:
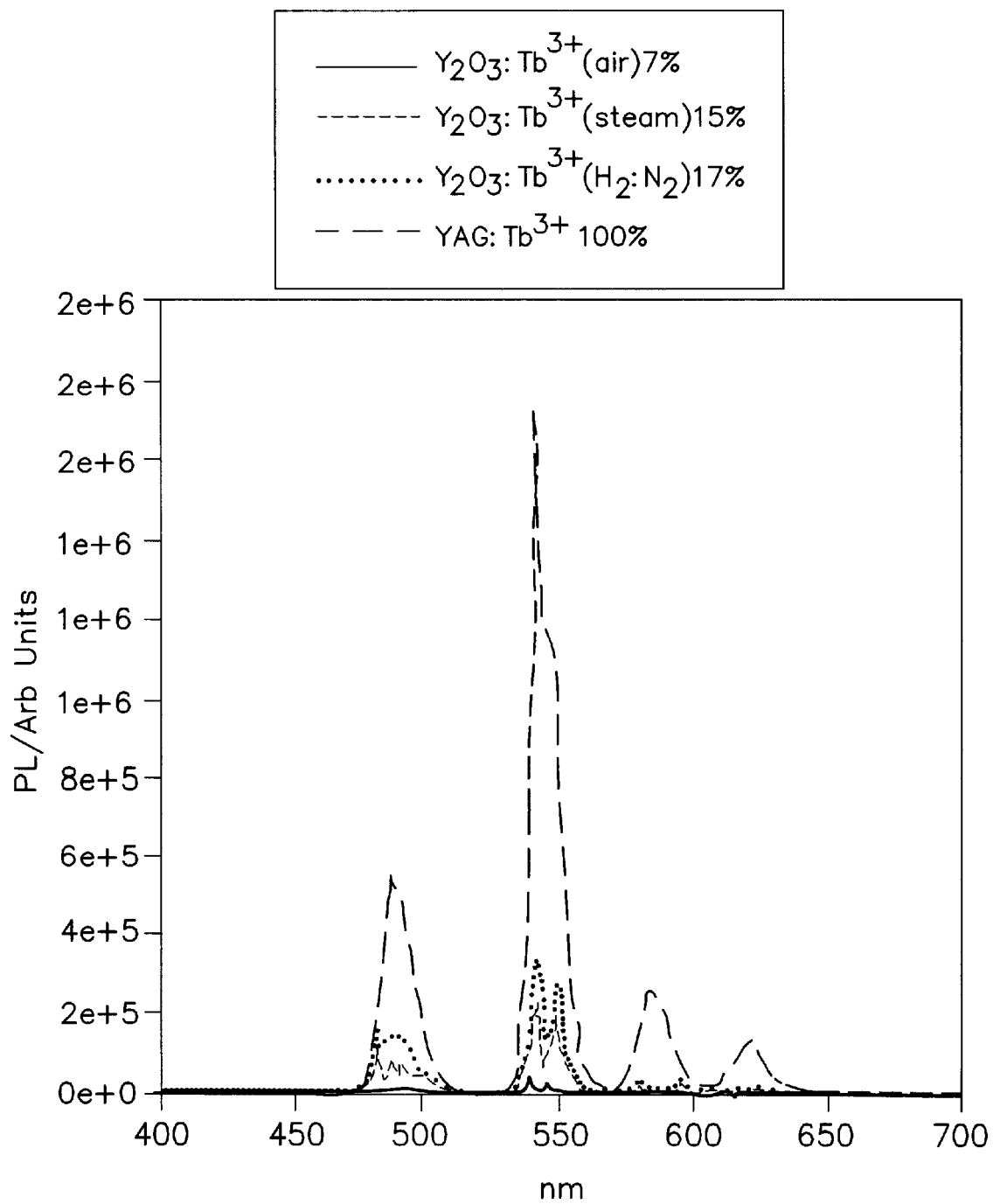
FIG. 1 shows the luminescence efficiency of nanocrystalline $Y_2O_3$:$Tb^{3+}$ and of nanocrystalline YAG:Tb.
Figure 2:
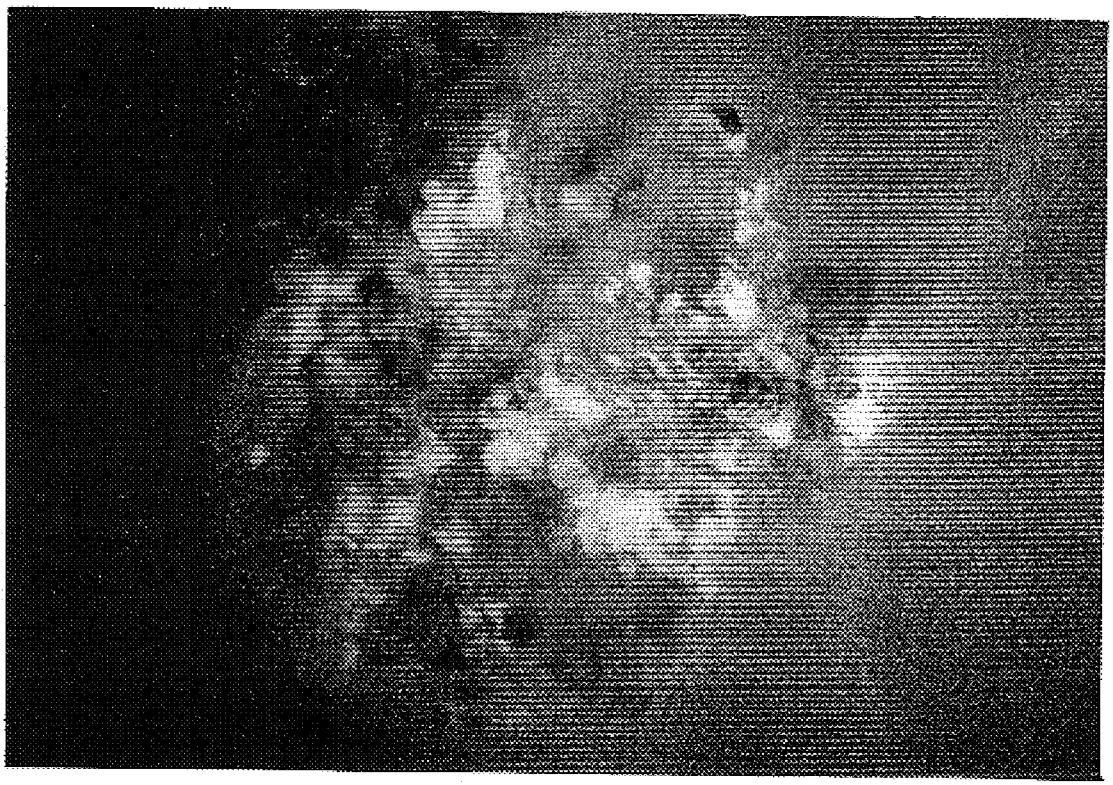
FIG. 2 is a high resolution electron micrograph (scale 1 cm=25 mm) of YAG:Tb calcined at 650° C.

The advantage of utilising the ternary host as the carrier for the $Tb^{3+}$ ion is demonstrated in FIG. 1 of the accompanying drawings, in which the luminescence efficiency of nanocrystalline $Y_2O_3$:$Tb^{3+}$ and the nanocrystalline YAG:Tb is shown. The luminescence efficiency of the YAG:Tb phosphor is at least five times that of the binary compound. The efficiency of $Y_2O_3$:Eu is about 70% that of YAG:Tb. In FIG. 2 a high resolution electron micrograph (scale 1 cm+25 nm) of the YAG:Tb calcined at 650° C. is shown; features appearing bright are crystals.

EXAMPLE 2

Synthesis of $Y_2SiO_3$:Ce

In this Example a seed nanoparticle of silica is first grown, and the yttrium/dopant shell is precipitated around it before firing.

(1) 0.7 ml of $SiCl_4$ is added dropwise to 40 ml water at 0° C. The solution is stirred vigorously during the precipitation. The $SiCl_4$ forms an hydrated silicon oxide precipitate with the evolution of HCl.

(2) 13 ml of the colloid solution is added to 27 ml 0.15M $YCl_3$ and 40 ml 5M urea at room temperature. The dopant typically 1 to 10% is then added in the form of 0.15M $CeCl_3$.

(3) The reaction vessel is sealed and placed in a water bath at 90° C. for two hours.

(4) The amorphous precipitate thus formed is washed, dried and fired under air at greater than 650° C. for three hours.

Luminesence from the ternary based material occurs in the blue region of the spectrum. Cerium does not exhibit luminescence at all if doped into a binary compound.

EXAMPLE 3

Figure 3:
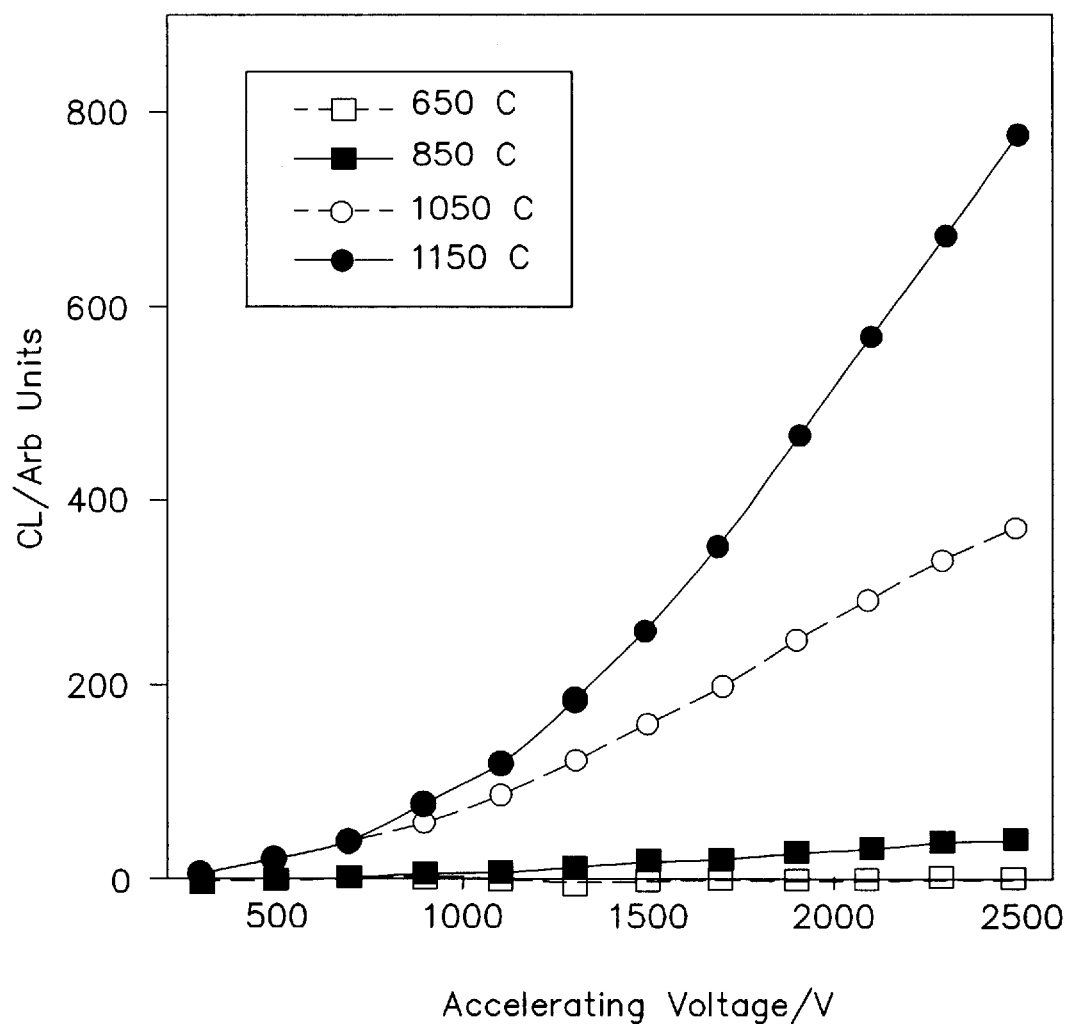
FIG. 3 shows the cathodoluminescence obtained with YAG:Tb powder at equal loading with MgO binder.

The amorphous phase precipitate of YAG:Tb ($Y_3Al_5O_2$:$Tb^{3+}$) obtained in Example 1 was washed and dried. It was then fired in air at temperatures of 650° C., 850° C., 1050° C. and 1150° C. for 3 hours. FIG. 3 shows the cathodoluminescence obtained with powders at equal loading with MgO binder. It can be seen that increasing the calcination to at least 1000° C. results in a significant increase in luminescence. At 1000V there is an increase in CL by a factor of 150 as the temperature is increased from 650° C. to 1150° C.

Figure 4:
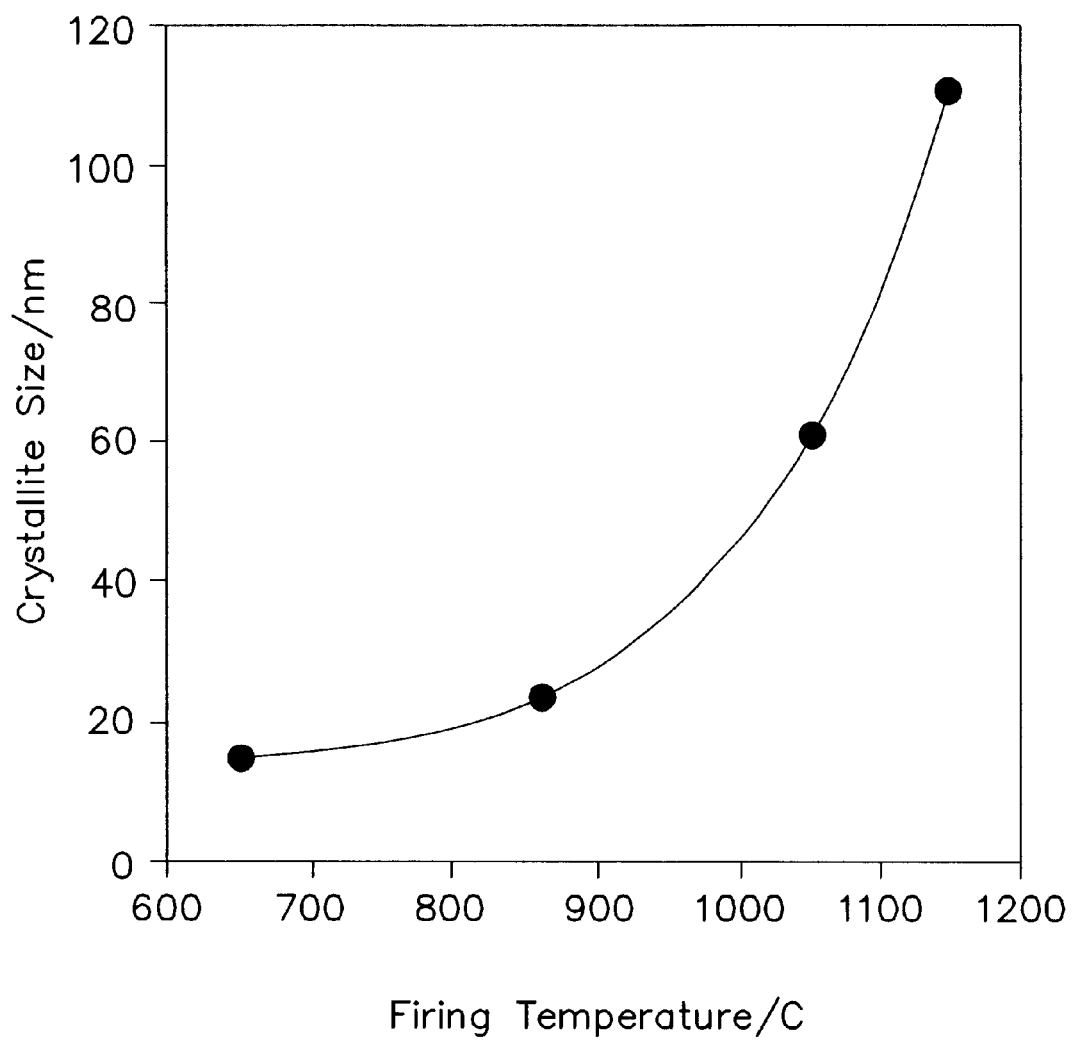
FIG. 4 shows the effect of firing temperature on crystallite size.

A concern with terbium-containing compounds is oxidation from 3+ to 4+ state, and the quenching behaviour of the 4+ state on luminescence. A characteristic of this oxidation is a change of colour of the powder from white to yellow or brown. No such colour change was observed. FIG. 4 shows how the crystallite size increases correspondingly as the firing temperature is increased.

What is claimed is:

1. A process for preparing phosphor particles of formula:

where Z is a metal of valency b,

X is a metal or metalloid, of valency a, such that $2y = b.z + a.x$, and

RE is a dopant ion of terbium, europium, cerium, thulium, samarium, holmium, erbium, dysprosium, praseodymium, manganese, chromium or titanium having a size not exceeding 1 micron which comprises preparing an aqueous solution of salts of Z, X and RE and a water soluble compound which decomposes under the reaction conditions to convert said salts into hydroxycarbonate, heating the solution so to cause said compound to decompose, recovering the resulting precipitate and calcining it at a temperature of at least 500° C.

2. A process according to claim 1 in which at least one of the salts is a chloride.

3. A process according to claim 1 in which the salts are formed in situ from the corresponding oxides and the corresponding acid.

4. A process according to claim 3 in which the oxide is provided as a colloidal precipitate.

5. A process according to claim 1 in which the said water-soluble compound is urea or oxalic acid.

6. A process according to claim 5 in which the solution containing the urea is heated to a temperature of 70 to 100° C.

7. A process according to claim 1 in which the calcination takes place in air or a reducing atmosphere.

8. A process according to claim 7 in which the calcination takes place at a temperature of ⅓ to ½ the Tamman temperature.

9. A process according to claim 8 in which the calcination takes place at a temperature of at least 1050° C.

10. A process according to claim 1 in which RE is added in an amount to provide a concentration of 1 to 10% in the particles.

11. A process according to claim 1 in which the heating step is carried out in a sealed vessel.

12. A process according to claim 8 in which the calcination takes place for 1 to 5 hours.

* * * * *

UNITED STATES PATENT AND TRADEMARK OFFICE
CERTIFICATE OF CORRECTION

PATENT NO.    : 6,706,210 B1
DATED         : March 16, 2004
INVENTOR(S)   : Dobson et al.

It is certified that error appears in the above-identified patent and that said Letters Patent is hereby corrected as shown below:

<u>Title page,</u>
Item [75], Inventors, should read:

-- Peter James Dobson, Oxford (GB);
   Gareth Wakefield, Oxford (GB) --

Signed and Sealed this

First Day of June, 2004

JON W. DUDAS
*Acting Director of the United States Patent and Trademark Office*